United States Patent [19]

Czernik

[11] 4,397,472
[45] Aug. 9, 1983

[54] CYLINDER HEAD GASKET WITH EXPANDED GRAPHITE FILLER

[75] Inventor: Daniel E. Czernik, Hinsdale, Ill.

[73] Assignee: Felt Products Mfg. Co., Skokie, Ill.

[21] Appl. No.: 440,977

[22] Filed: Nov. 12, 1982

[51] Int. Cl.³ .............................................. F16J 15/12
[52] U.S. Cl. ................................. 277/235 B; 277/180; 277/DIG. 6
[58] Field of Search ........... 277/235 R, 235 A, 235 B, 277/166, DIG. 6, 188 R, 188 A, 180

[56] References Cited

U.S. PATENT DOCUMENTS

| | | | |
|---|---|---|---|
| 3,930,656 | 1/1976 | Jelinek | 277/180 |
| 4,075,114 | 2/1978 | Ishikawa et al. | 277/DIG. 6 |
| 4,155,561 | 5/1979 | Rudy et al. | 277/235 B X |
| 4,272,085 | 6/1981 | Fujikawa et al. | 277/235 B |

FOREIGN PATENT DOCUMENTS 2234001 1/1974 Fed. Rep. of Germany ... 277/235 B

Primary Examiner—Robert S. Ward, Jr.
Attorney, Agent, or Firm—Dressler, Goldsmith, Shore, Sutker & Milnamow, Ltd.

[57] ABSTRACT

An improved cylinder head gasket assembly for an internal combustion engine. The zone of the metallic core of the gasket assembly immediately surrounding a combustion chamber is provided with an annular embossment defining a recess which is at least partially filled with a flexible, expanded compressible graphite material. The zone of the embossment is devoid of facing layers. Preferably, the embossment is embraced and ensheathed by armoring, so that the graphite material seals between the armor and the metallic core, all to enhance sealing of the combustion chamber. A secondary embossment filled with graphite material may provide a secondary seal.

10 Claims, 4 Drawing Figures

CYLINDER HEAD GASKET WITH EXPANDED GRAPHITE FILLER

BACKGROUND OF THE INVENTION AND THE PRIOR ART

This invention relates to a cylinder head gasket assembly, and more particularly to a gasket having an embossment surrounding, and immediately adjacent to, the combustion openings in the gasket assembly. The embossment is filled with expanded graphite and produces an enhanced heat-resistant seal for the engine cylinder.

Gaskets are widely used for providing seals between pairs of confronting surfaces, such as between engine blocks and heads in internal combustion engines, and the like. Gaskets used in such applications must provide an effective seal between the relatively large number of interconnecting cavities carrying fluids of different types and under different pressures so that the fluids do not intermingle or leak externally. Such gaskets frequently incorporate a metallic core and compressible facings and are provided with special sealing means at the cylinder openings. In some such gaskets one or more sealing embossments surrounding the cylinders are provided in the metallic core. Such embossments provide projections on the body of the gasket. One purpose is to provide a smaller area of contact between the gasket and the confronting surfaces, thereby to increase the compression force per unit area, hence to generate a more effective seal. U.S. Pat. No. 3,352,564 to Johnson discloses a gasket having typical embossments which are formed by deforming the metal body, as around cylinder openings, so the gasket body is deflected upwardly and downwardly from the plane of the surrounding gasket metal. An embossment made in this manner includes a raised portion or projection, and defines a corresponding indented portion or recess on the other side of the projection.

One of problems encountered with gaskets having embossments of the kind typified by those shown in the Johnson patent is that the embossments flatten under compression. When this occurs, the load which was intended to be concentrated in the zone of the embossment tends to be distributed over a much broader surface of the gasket, consequently lowering the effectiveness of the seal. Further the flattening tends to be inelastic so that the seal can be ineffective for that reason alone.

Further, such embossments adjacent the combustion cylinders, such as at the combustion openings of gaskets (such as shown in U.S. Pat. No. 4,325,559) are subject to great stresses and high temperatures. In some such gaskets, such temperatures and stresses gradually tend to reduce the effectiveness of the seal. Thus, even if fillers, such as the elastomeric fillers of the types referred to in U.S. Pat. No. 4,140,323 are used, when used adjacent the combustion opening they tend to degrade and thus the effectiveness of the seal tends to diminish in use.

Cylinder head gaskets in which embossments have been suggested for use include those disclosed in the above-mentioned U.S. Pat. No. 4,325,559, as well as in British Pat. No. 899,552 which discloses the use of a lacquer and flake graphite as a filler therefor and in German Pat. No. 819,177 in which various fillers are described for use in the recesses of embossments. Further, gaskets, such as those used for pipe flanges (in which stresses, repeated dynamic loading and temperature concerns are of relatively little concern as compared to automotive head gasket applications) and having annular embossments filled with a deformable elastomeric sealing material are shown in Black U.S. Pat. No. 3,721,452. It has also been suggested that an expanded graphite material be used as a filler in similar pipe flange sealing gasket embossments. Finally, expanded graphite material, such as Calagraph referred to hereinafter, has been suggested for use in high temperature, high stress applications, such as automotive applications. Calagraph is sold by Calcarbon, a division of Polycarbon, Inc. having offices in Chatsworth, California.

SUMMARY OF THE INVENTION

An improved cylinder head gasket assembly for an internal combustion engine is provided in accordance with the present invention. The gasket assembly is adapted to be positioned between an engine head and an engine block. The gasket assembly defines at least two spaced apart adjacent combustion openings.

The gasket assembly includes a main body portion having a central metallic core providing first and second main surfaces and also having a composite facing layer on each of the main surfaces. The facing layers overlie the substantial majority of each of the main surfaces. The central metallic core defines the combustion openings. The facing layers are spaced away from the combustion openings and define zones surrounding the combustion openings which are essentially devoid of facing layers.

An annular embossment surrounding each combustion opening is provided in the core intermediate the combustion opening and the facing layers. The embossment comprises an annular projection extending outwardly of one main core surface and an annular recess extending inwardly of the other main core surface. Compressible, flexible, expanded graphite is disposed in, and at least partially fills each annular recess, whereby when the gasket assembly is disposed and compressed between an engine head and an engine block, the embossment is compressed and the flexible expanded graphite is compressed to effect a seal in the zone of the embossment between the head and the block to minimize leakage and enhance the sealing effect of the gasket assembly at the combustion openings. Preferably, the gasket assembly further includes armor for each of the combustion openings, in which case the peripheries of the combustion openings are embraced by the armor so that the expanded graphite is compressed between the armor and the case, thereby to further enhance the sealing effect of the gasket assembly between the head and the block. A secondary oppositely directed expanded graphite filled embodiment may also be used.

Further objects, features and advantages of the present invention will become apparent from the following description and drawings.

THE DRAWINGS

Figure 3:
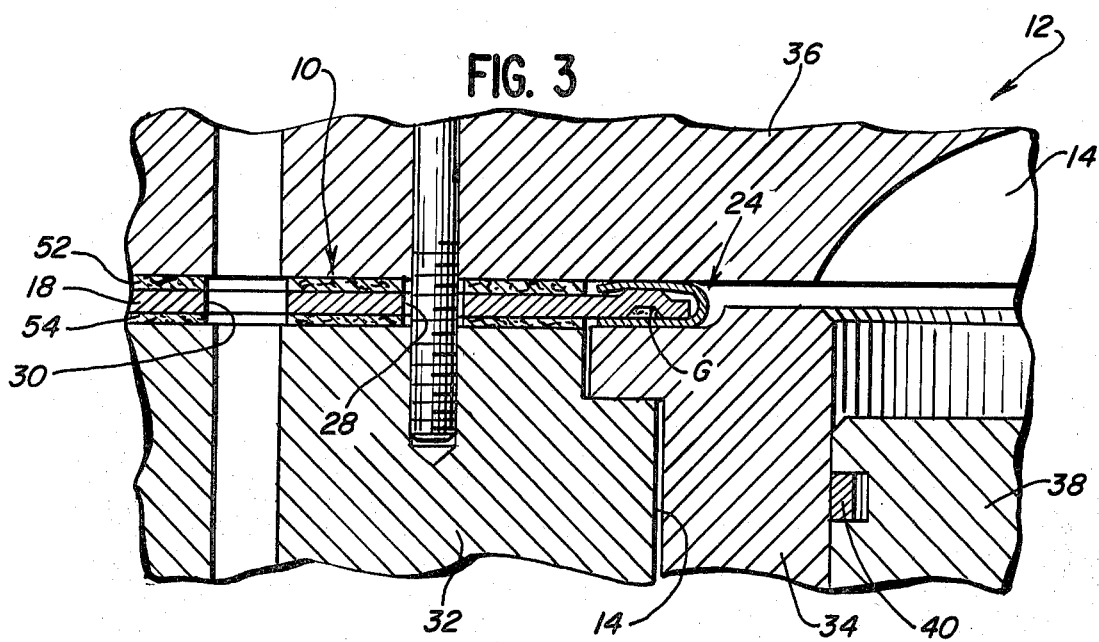
FIG. 3 is a cross-sectional view showing the gasket assembly of FIG. 1 in a position of use between the head and block of an internal combustion engine.

Referring now to the drawings, the improved head gasket assembly 10 of this invention is especially configured and constructed for use in an internal combustion engine 12 having a plurality of combustion cylinders 14 (only one of which is shown in FIG. 3) arranged, such as along the longitudinal axis of the engine. Although it is clear that gasket assemblies made in accordance with this invention can be used with an engine having only one combustion opening, the invention will be illustrated in connection with a multi-combustion opening gasket assembly and engine. Specifically, the gasket assembly 10 includes a main elongated body portion 16 having a generally flat central metallic core or base 18. The base 18 has a top or first generally planar main surface 20 and bottom or second generally planar main surface 22. The top and bottom main surfaces 20, 22 are generally parallel to each other. The core is about 0.020 inch thick, and may be from about 0.010 to about 0.040 inch thick.

A sheet of composite compressible gasket facing material 52, 54 different from the material of the base 18 is secured to each main surface of the base. Facing sheets 52, 54 are fiber reinforced and are attached mechanically or adhesively to the main surfaces 20, 22 of the central core 18, such as by a conventional laminating process. The most popular and frequently used facings incorporate asbestos or glass fibers and utilize nitrile, neoprene or polyacrylic elastomers to provide the self-sustaining facings. In the embodiment illustrated, the facings have a thickness of about 0.020 inch, although, of course, this may vary with the application, and the thicknesses may range from about 10 to 30 thousandths inch or more. Facing sheets 52, 54 generally resist degradation by oils and coolants, retain torque, minimize extrusion, and exhibit heat resistance.

The main gasket body 16 is die cut or blanked out, such as with a stamping machine, punch press or other suitable form of equipment to provide the requisite number of piston-size apertures or combustion openings, such as the two combustion openings 24 and 26 shown, bolt holes 28, and a plurality of fluid flow passageways, such as oil and water passageways 30.

Figure 1:
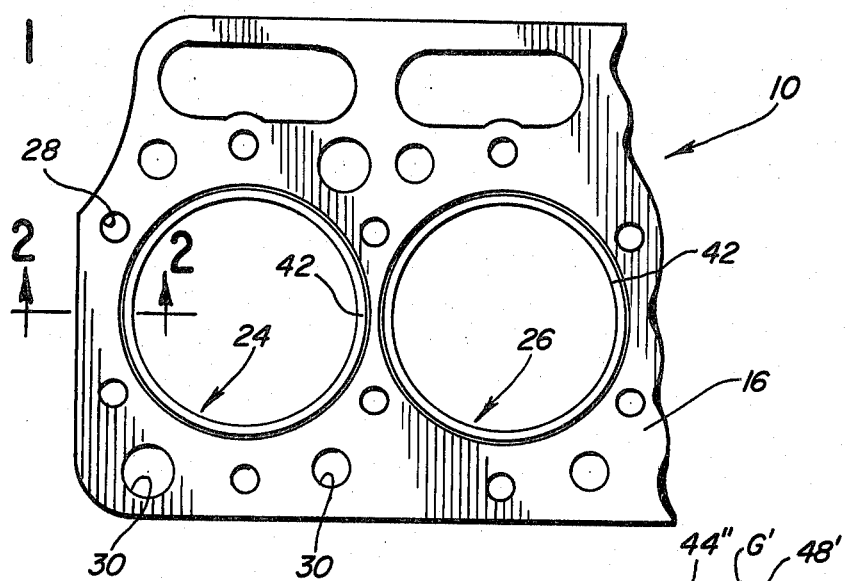
FIG. 1 is a fragmentary plan view of a head gasket assembly of the present invention.
Figure 2:
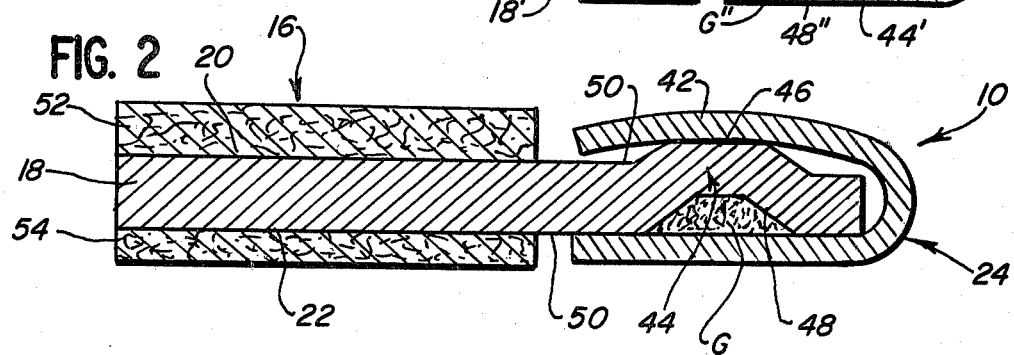
FIG. 2 is an enlarged cross sectional view taken substantially alone line 2—2 of FIG. 1.

FIGS. 2 and 3 illustrate one application of the gasket assembly shown in FIG. 1. Specifically, the engine 12 which is illustrated includes an engine block 32 having a liner 34, and a cylinder head 36. Of course, blocks without liners may be used as well. The cylinder head 36 and the liner 34 define at least two combustion chambers 14 (only one of which is shown). Each combustion chamber 14 contains a piston 38 joined to the crankshaft (not shown). The combustion chamber 14 is sealed by a piston ring 40 carried by the piston 38. The gasket assembly 10 is juxtaposed between the engine block 32 and cylinder head 36.

The specific embodiment of the gasket assembly 10 illustrated further comprises armoring, such as a generally U-shaped armor 42 in the combustion openings 24, 26 to help protect the main body portion 16 of the gasket from the temperature and pressure conditions in the combustion chambers 14, and to help seal-off the main body portion from the combustion gases. The armor embraces the peripheries of the combustion openings. The material, thickness and configuration of the armor 42 is a function of a number of factors known to those skilled in the art. For example, high output engines such as turbocharged engines normally require stainless steel armor for improved high temperature and fatigue resistance. The thickness of the armor should be such that it compensates for the thicknesses of the facings, consistent with the proportioning of the engine parts to be sealed.

In the embodiment shown, the core 18 is embossed adjacent the combustion openings 24, 26 to form embossments 44 which are embraced and ensheathed by the U-shaped armor 42. By varying the height and/or width of the embossments 44 a wide range of loads, and compression properties can be provided.

As seen in the drawings, the embossment 44 is annular and surrounds a combustion chamber 14 intermediate the combustion opening 24 and the facing layers 52, 54 in a zone 50 essentially devoid of facing layers. The embossment provides an annular projection 46 extending outwardly of one main core surface and an annular recess 48 extending inwardly of the other main core surface.

In accordance with the present invention the recess 48 is provided with high temperature resistant, flexible, compressible expanded graphite G which at least partially fills the recess 48. The expanded graphite is positioned so that it is disposed between the head and the block, so that when the embossment is compressed, the expanded graphite is compressed and suitably redistributed to help effect a seal in the zone of the embossment, thereby to minimize leakage and enhance the sealing effect of the gasket assembly. When the armor 42 is present, the expanded graphite assists in providing an embossment of increased strength and temperature resistance, whereby the sealing effect of the armoring between the head and the block is enhanced. A longtime, effective, temperature-resistant seal which does not require retorquing, in part because the expanded graphite has a degree of resiliency and recovery, is thus provided immediately adjacent to the combustion chambers 14, thereby also to protect the gasket assembly and the facing layers in particular.

Figure 4:
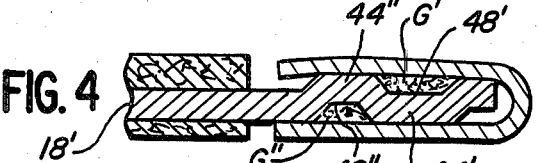
FIG. 4 is a cross-sectional view which is like FIG. 2 and which illustrates a further embodiment of this invention.

In a further embodiment of the present invention, as illustrated in FIG. 4, a central core 18' is provided with a pair of oppositely directed embossments 44' and 44" adjacent the combustion opening. Embossment 44' and 44" open outwardly of opposite main surfaces of the metallic core and each is provided with expanded graphite which at least partially fills the first and second embossment recesses 48', 48". As will be seen, the primary embossment 44' and its recess 48' is at least about twice the size of the secondary embossment 44" and recess 48" and the quantity of graphite G' is at least about twice as much as the quantity of Graphite G" in recess 48". Thus, the primary recess and embossment provides a primary seal which is principally depended upon to affect the seal at the combustion opening. The principal part of the load in the zone of the embossments is taken up by the primary seal. However, the secondary embossment which provides a secondary seal absorbs some of the load to provide a secondary combustion opening seal which serves to back up the primary seal.

It appears that the expanded graphite, when trapped in the embossment and compressed, although of course very different from O-rings, may behave like a trapped O-ring resulting, inter alia, in improved recovery, thereby improving the effectiveness of the seal as compared to an unfilled embossment, as well as providing a seal which has improved resistance to degradation under the severe temperature and pressure conditions experienced at combustion openings in head gaskets.

A suitable expanded, flexible graphite material is available from Calcarbon, a division of Polycarbon, Inc. under the name Calgraph A. A typical Calgraph A comprises a minimum of about 80% graphite and about 20% ash maximum at 950° C. (ASTM C-561) and has a density of about 70 pounds per cubic foot. The material is essentially devoid of binders, resins, fillers and additives. A like material is said by Union Carbide Corporation to be made in accordance with U.S. Pat. No. 3,404,061.

Although but one embodiment of the invention has been shown and described, it is to be understood that the various modifications and substitutions may be made by those skilled in the art without departing from the novel spirit and scope of the invention, and accordingly the invention is intended to embrace all modifications within the scope of the appended claims.

What is claimed is:

1. An improved cylinder head gasket assembly for an internal combustion engine adapted to be positioned between an engine head and an engine block, said gasket assembly defining at least one combustion opening, said gasket assembly comprising:
   a main body portion comprising a central metallic core having first and second main surfaces and composite facing layer on each of said main surfaces and overlying the substantial majority of each of said surfaces,
   said central metallic core defining said combustion opening and said facing layers being spaced away from said combustion opening and defining zones surrounding said combustion opening essentially devoid of facing layers,
   an annular embossment in said core surrounding said combustion opening intermediate said combustion opening and said facing layers, said embossment comprising an annular projection extending outwardly of one main core surface and an annular recess extending inwardly of said other main core surface, and
   compressible, flexible expanded graphite disposed in and at least partially filling said annular recess,
   whereby when said gasket assembly is disposed and compressed between an engine head and an engine block, said embossment is compressed and said flexible expanded graphite is compressed to effect a seal in the zone of the embossment between said head and said block to minimize leakage and enhance the sealing effect of the gasket assembly at said combustion opening and to minimize degradation of the seal effected thereat.

2. An improved cylinder head gasket assembly in accordance with claim 1, wherein said gasket assembly further includes armor for said combustion opening, and wherein the periphery of said combustion opening is embraced by said armor, whereby the expanded graphite is compressed between said armor and said core, thereby to enhance the sealing effect of the gasket assembly between said head and said block.

3. An improved cylinder head gasket assembly in accordance with claim 1, wherein there is provided a second annular embossment in said core surrounding said combustion opening intermediate said combustion opening and said facing layers, said second embossment comprising a second annular projection extending outwardly of one main core surface and a second annular recess extending inwardly of said other main core surface, and
   compressible, flexible expanded graphite disposed in and at least partially filling said second annular recess,
   whereby when said gasket assembly is disposed and compressed between an engine head and an engine block, said second embossment and said flexible expanded graphite in said second recess are compressed to effect a secondary seal in the zone of said combustion opening between said head and said block to minimize leakage and enhance the sealing effect of the gasket assembly at said combustion opening and to minimize degradation of the seal effected thereat.

4. An improved cylinder head gasket assembly in accordance with claim 3, wherein said gasket assembly further includes armor for said combustion opening, and wherein the periphery of said combustion opening is embraced by said armor, whereby the expanded graphite in each of said recesses is compressed between said armor and said core, thereby to enhance the sealing effect of the gasket assembly between said head and said block.

5. An improved cylinder head gasket assembly in accordance with claim 3, wherein said recess and said second recess are oppositely directed and open outwardly of opposite main surfaces of said metallic core.

6. An improved head gasket assembly in accordance with claim 3 wherein said first annular embossment is spaced closer to said combustion opening than is said second annular embossment and the quantity of expanded graphite in said first embossment is at least about twice as much as in said second embossment, wherein said first embossment provides a primary combustion opening seal and said second embossment provides a secondary combustion opening seal.

7. An improved cylinder head gasket assembly for an internal combustion engine adapted to be positioned between an engine head and an engine block, said gasket assembly defining at least two spaced apart adjacent combustion openings, said gasket assembly comprising:
   a main body portion comprising a central metallic core having first and second main surfaces and composite facing layer on each of said main surfaces and overlying the substantial majority of each of said surfaces,
   said central metallic core defining said combustion openings and said facing layers being spaced away from said combustion openings and defining zones surrounding said combustion openings essentially devoid of facing layers,
   an annular embossment in said core surrounding each said combustion opening intermediate said combustion opening and said facing layers, said embossment comprising an annular projection extending outwardly of one main core surface and an annular recess extending inwardly of said other main core surface, and
   compressible, flexible expanded graphite disposed in and at least partially filling said annular recess, and
   armor for said combustion openings and wherein said peripheries of said combustion openings are embraced by said armor,
   whereby when said gasket assembly is disposed and compressed between an engine head and an engine block, said embossment is compressed and said flexible expanded graphite is compressed to effect a seal in the zone of the embossment between said head and said block to minimize leakage and enhance the sealing effect of the gasket assembly at the combustion openings.

8. An improved cylinder head gasket assembly in accordance with claim 7, wherein there is provided a second annular embossment in said core surrounding said combustion opening intermediate said combustion opening and said facing layers, said second embossment comprising a second annular projection extending outwardly of one main core surface and a second annular recess extending inwardly of said other main core surface, and compressible, flexible expanded graphite disposed in and at least partially filling said second annular recess, whereby when said gasket assembly is disposed and compressed between an engine head and an engine block, said second embossment and said flexible expanded graphite in said second recess are compressed to effect a secondary seal in the zone of said combustion opening between said head and said block to minimize leakage and enhance the sealing effect of the gasket assembly at said combustion opening and to minimize degradation of the seal effected thereat.

9. An improved cylinder head gasket assembly in accordance with claim 8, wherein said recess and said second recess are oppositely directed and open outwardly of opposite main surfaces of said metallic core.

10. An improved head gasket assembly in accordance with claim 9 wherein said first annular embossment is spaced closer to said combustion opening than is said second annular embossment and the quantity of expanded graphite in said first embossment is at least about twice as much as in said second embossment, wherein said first embossment provides a primary combustion opening seal and said second embossment provides a secondary combustion opening seal.

* * * * *